| BINARY | SELECTED TERNARY CODE SET 1 | | SELECTED TERNARY CODE SET 2 | |
|---|---|---|---|---|
| 11 | +1 | −1 | +1 | −1 |
| 10 | +1 | 0 | −1 | 0 |
| 01 | 0 | +1 | 0 | −1 |
| 00 | −1 | +1 | −1 | +1 |

INVENTOR
J. M. SIPRESS
BY Leonard W. Arnold
ATTORNEY

Jan. 31, 1967 J. M. SIPRESS 3,302,193

PULSE TRANSMISSION SYSTEM

Filed Jan. 2, 1964 4 Sheets-Sheet 3

United States Patent Office 3,302,193

Patented Jan. 31, 1967

3,302,193

PULSE TRANSMISSION SYSTEM

Jack M. Sipress, Summit, N.J., assignor to Bell Telephone Laboratories, Incorporated, New York, N.Y., a corporation of New York Filed Jan. 2, 1964, Ser. No. 335,014
11 Claims. (Cl. 340—347)

This invention relates to the transmission of information by pulse techniques and more particularly to such transmission in systems containing regenerative pulse amplifiers.

One of the advantages of transmission by pulse code modulation is that the pulse train may be regenerated at repeater station before the pulses have been degraded by noise or apparatus defects to a point where they can no longer be reliably decoded. After such regeneration the pulses are again clean and sharp and such regeneration can be carried on successively at a number of repeater points between a transmitter station and a receiver station. In carrying out such regeneration it is desirable that the current or voltage amplitudes of the pulses and spaces not sag toward the average current, and to avoid such sag or drift special pulse trains have been employed.

One such pulse train is the bipolar pulse train taught in United States Patent 2,996,578 which issued to F. T. Andrews on August 15, 1961. There each binary "0" is transmitted as the absence of a pulse and each binary "1" is transmitted as a pulse opposite in polarity to the preceding pulse. Because each successive pulse is of opposite polarity, the resulting pulse train is inherently free of drift.

In many pulse transmission systems the repeaters are self-timed in the sense that they derive a timing signal, to govern the regeneration of the transmitted signal, from the transmitted signal itself. As a practical matter it has been found that in order to derive this timing signal from the transmitted signal is an economically feasible system at least one pulse, whether it be a positive going pulse or a negative going pulse, must be received in at least approximately every fifteen time slots. In the pulse transmission system described in the above mentioned patent it is quite possible that a pulse may not be transmitted at least once every fifteen time slots since each binary "0" is transmitted as the absence of a pulse. Thus a long train of binary "0's," longer in duration than fifteen time slots, is transmitted as the absence of pulse and timing information is then lost.

It is an object of this invention to eliminate or reduce the tendency of the center line of an irregular pulse train to wander or drift while at the same time eliminating the possibility of losing timing information due to the transmission of a long train of "0's" or spaces.

In accordance with this invention a binary pulse signal is converted into a three state signal of positive pulses, negative pulses, and spaces in accordance with a first predetermined code set until a three state signal is generated having a predetermined direct current component whereupon the conversion is accomplished in accordance with a second predetermined code set until a three state signal having a second predetermined direct current component is generated and the conversion again carried out in accordance with the first code. The resulting code comprising two code sets insures that as a result of the conversion the resulting three state signal has no direct current component and that a long train of spaces will not be transmitted, thus facilitating the use of self-timed repeaters in a PCM system.

More specifically, the input signal is divided into N-digit binary words which are then encoded into three level codes in either of two code sets (which are interleaved as described below) in accordance with the following rules.

(1) If the N-digit binary word contains an even number of "1's" or marks, it is represented in both code sets in its corresponding bipolar form starting with a positive pulse (+1).

(2) If the N-digit binary word contains an odd number of marks, it is represented in its corresponding bipolar form starting with a positive pulse (+1) in the first code set and a negative pulse (—1) in the second code set.

(3) Words with a low density of marks, however, are handled differently. From all the remaining possible N-digit three state words are selected those whose algebraic sum of the amplitudes of the bits is +1, 0, or —1. If that sum is zero the three state word is used in both code sets to represent the same binary word; but, if that sum is +1 the three state word is used in code set number 1 to represent a binary word while the inverted (i.e., positive and negative marks interchanged) is used in code set number 2 to represent the same binary word.

Thus where the incoming pulse train is divided into words of two bits each, i.e., $N=2$, the resulting possible binary words are 1, 1, 1, 0, 0, 1, and 0, 0. According to rule (1) above the binary word 1, 1 is represented by its bipolar form in both code sets starting with a positive going mark thus

| Binary Word | Code Set No. 1 | Code Set No. 2 |
|---|---|---|
| 1, 1 | +1 —1 | +1 —1 |

According to rule (2) the words 1, 0 and 0, 1 are represented as follows

| Binary Word | Code Set No. 1 | Code Set No. 2 |
|---|---|---|
| 1, 0 | +1 0 | —1 0 |
| 0, 1 | 0 +1 | 0 —1 |

Finally from among the remaining possible ternary words the binary word 0, 0 is encoded as —1 +1 in both code sets thusly

| Binary Word | Code Set No. 1 | Code Set No. 2 |
|---|---|---|
| 0, 0 | —1 +1 | —1 +1 |

To accomplish this conversion from binary to so-called three state code the binary input signal is first divided into successive 2-bit words which are then converted into three state code in accordance with code set number 1. When a three state code word the algebraic sum of the amplitude of whose bits is +1 is generated in accordance with code set number 1, (i.e., for binary words 1, 0 or 0, 1) the equipment after generating the three state code word switches over to convert the binary words to three state code words in accordance with the code set number 2. The generation of a word in accordance with code set number 2 whose sum is —1 (i.e., for binary words 1, 0 or 0, 1) causes the equipment to switch back to the use of code set number 1. Because the equipment switches from one code set to the other in response to a generated three state word whose algebraic sum of the amplitudes of the bits is not zero (either +1 or —1) the resulting output signal has no direct current component, thus there is no drift to make regeneration difficult.

In addition, and most important to the transmission of digital information over a transmission system employing self-timed repeaters is the fact that the resulting pulse train cannot contain a train of more than two consecutive spaces.

This invention will be more fully comprehended from the following detailed description taken in conjunction with the drawings in which.

Figures 1, 2:
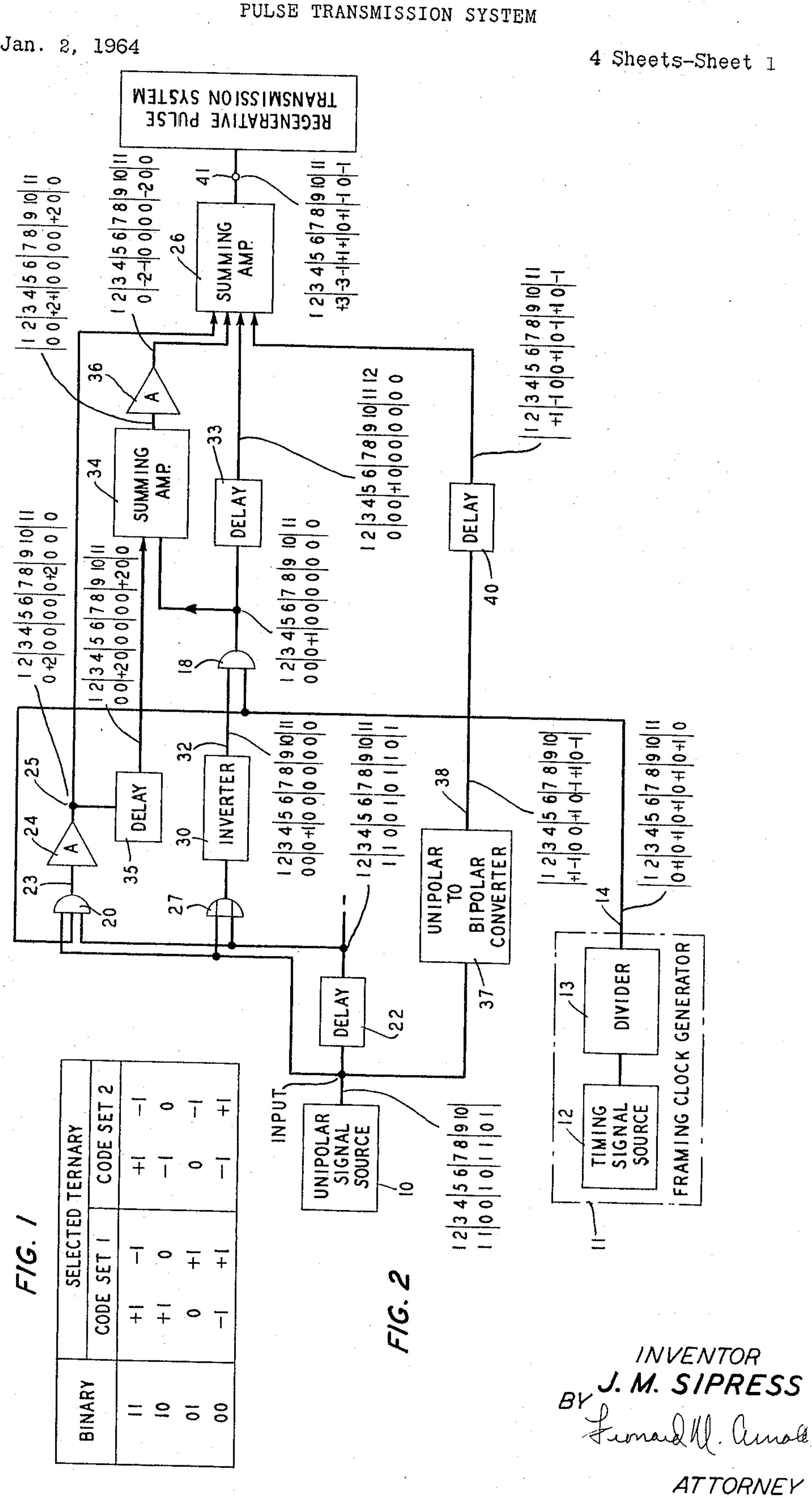
FIG. 1 is a table of the binary to three state code where $N=2$.
FIG. 2 is a block diagram of a unipolar to three state code converter embodying this invention.

A source 10 of unipolar pulses is connected to the input of the code converter shown in FIG. 2. To facilitate an understanding of the operation of the apparatus shown in FIGS. 2 through 5 a typical train of unipolar pulse signals occupying ten time slots is shown at the output terminal of source 10 with the time slots numbered 1 through 10 and a unipolar mark indicated by a "1" and a space indicated by a "0." Bipolar and three state signals shown in other parts of the drawings are marked in the following manner: a positive pulse is marked "+1"; a space or zero is indicated by a "0"; and a negative pulse of unity amplitude is indicated by a "−1." Pulses of greater than unity amplitude are marked in the drawing of FIG. 2 by a positive or negative sign to indicate the polarity of the pulse and a number immediately following to indicate its amplitude. Thus "+2," for example, indicates a pulse of positive going amplitude whose height is twice unity amplitude.

A so-called frame clock generator 11 governs much of the operation of the circuitry shown in FIG. 2. The function of the frame clock generator is to divide the unipolar pulses from source 10 into binary words of two bits each, and it comprises a clock signal source 12 and a divider circuit 13, which divides by two. The clock signal source is found at each terminal of a regenerative pulse transmission system such as that disclosed in the above mentioned Patent 2,996,578, and by C. G. Davis on pages 1–24 of the January 1962 issue of the Bell System Technical Journal. Since the clock signal source is connected to divider 13 the output of divider 13 consists of a pulse in every second time slot as indicated by the signal shown at output terminal 14 of divider 13. The output terminal 14 of divider 13 is connected to one input terminal of each of AND gates 18 and 20 so that those AND gates can only be actuated during every even numbered time slot of the input signal from source 10.

The input signal is directly applied to a second input terminal of AND gate 20 and also delayed by one time slot by delay circuit 22 and applied to the third input terminal of AND gate 20. As a result of these connections AND gate 20 can only be actuated during every even numbered time slot and then only after two consecutive unipolar "1's" have occurred. That is to say, AND gate 20 will produce an output signal in an even numbered time slot only if in that time slot and in the immediately preceding time slot, two unipolar "1's" are received from source 10.

The output of AND gates 20 operates to control, in part, the conversion of the binary word 1, 1 to the three level code word +1, −1. Toward this end the output terminal 23 of AND gate 20 is connected to an amplifier 24 which doubles the amplitude of any mark produced at the output terminal 23 of AND gate 20. As a result at output terminal 25 of amplifier 24 pulses of twice unity amplitude are present during the second and eighth time slots in response to the binary words 1, 1 from source 10 in the first and second and seventh and eighth time slots. Output terminal 25 of amplifier 24 is in turn connected to one input terminal of a summing amplifier 26 where the output signal from amplifier 24 will be used in combination with signals derived from AND gate 18 to produce proper code conversion for the binary word 1, 1. Summing amplifier 26 may be that type shown on page 252 of "Electron Tube Circuits" by Samuel Seely, published by the McGraw-Hill Book Company, 1958.

AND gate 18 governs in part the conversion of unipolar word 0, 0 to the three state signal −1, +1. To accomplish this end it is enabled only during even numbered time slots upon the occurrence in that even numbered time slot and the immediately preceding time slot of the binary word 0, 0. Source 10 is connected to one input terminal of an OR gate 27, and the input signal is also delayed by one time slot by delay circuit 22 and applied to a second input terminal of OR gate 27. The output terminal of OR gate 27 is connected to the input of an inverter or NOT circuit 30 which may be that shown on page 401 of "Pulse and Digital Circuits" by Millman and Taub, published by the McGraw-Hill Book Company, 1956. Inverter 30 generates a pulse when a space is present at its input terminal and generates a space when a pulse is present at its input terminal. As a result, upon the occurrence of two consecutive spaces, a pulse is generated at the output terminal 32 of the inverter circuit 30. The resulting signal then causes AND gate 18 to generate a pulse which is delayed one time slot by delay circuit 33 and applied to a second input terminal of summing amplifier 26 where it combines with the signals derived from the output of AND gate 20 and another signal to be derived from AND gate 18 to produce the proper encoding of the binary words 1, 1 and 0, 0 from source 10.

A second summing amplifier 34 is connected to receive both the output signals from both AND gate 18 and amplifier 24 delayed by one time slot by delay circuit 35. The output terminal of summing amplifier 34 is in turn connected to the input of an amplifier 36 which has a gain of −1, that is, amplifier 36 is a phase inverter. The output terminal of amplifier 36 is connected to a third input of summing amplifier 26.

The three above described input signals to amplifier 26 derived from the output signals from AND gates 20 and 18 produce the codes for the binary words 1, 1 and 0, 0. A fourth input signal to summing amplifier 26 to govern the encoding of binary words 1, 0 and 0, 1 is obtained from a unipolar to bipolar converted 37, which may be that shown in copending application of N. E. Lentz, Serial No. 178,781, assigned to the present assignee and filed on March 9, 1962. Converter 37 functions to generate marks of alternate polarity in response to unipolar input pulses and generates a space in response to each received space from source 10. The output signal, shown at terminal 38, is delayed one time slot by a delay circuit 40 and the resulting delayed bipolar signal applied to the fourth input terminal of summing amplifier 26.

As a result of the four input signals applied to summing amplifier 26 the resulting algebraically summed output signal is as shown in FIG. 2 at output terminal 41. In response to the unipolar marks present in the first two time slots of the signal from source 10 a positive pulse of three times unity amplitude and a negative pulse of three times unity amplitude were generated in the second and third time slots of the signal to be applied to the regenerative pulse transmission system. Since the transmission system is digital in nature it interprets +3 and −3 pulses as simply a +1 and a −1 respectively. Alternatively amplifier 26 may also incorporate a limiter to limit the output signal to unity amplitude. The third and fourth time slots of the input signal from source 10 each consisted of a space and corresponding to that input signal a negative pulse and a positive pulse each of unity amplitude were generated in the fourth and fifth time slots of the resulting output signal. In the fifth and sixth time slots the input signal contained the binary word 1, 0 which according to code set number 1 is to be, and was, encoded in the sixth and seventh time slots of the output signal as a positive going mark and a zero. As a result of the generation in accordance with code set number 1 of a word the algebraic sum of the amplitudes of whose digits is +1 the equipment must then generate further words in accordance with code number 2. This was accomplished since, as may be seen in the seventh, eighth, ninth and tenth time slots the input signal comprised the binary words 1, 1 and 0, 1 and these were encoded in accordance with code set number 2 as three state words +1, −1 and 0, −1 in the eigth, ninth, tenth and eleventh time slots, respectively. Thus the apparatus shown in FIG. 2 initially converted binary words to three state words in accordance with code set number 1 but when a three state word was generated the algebraic sum of the amplitude of whose bits was +1 the equipment shifted over to code set number 2. Similarly, when a three state word is generated in accordance with code set number 2 the algebraic sum of the amplitude of whose bits is −1, the equipment then generates three state words in accordance with code set number 1. As a result, the output signal at terminal 41 has no direct current component and in addition, and most important, it is impossible for it to generate more than two consecutive spaces regardless of the number of consecutive spaces (zeros) in the input signal. Thus the proper operation of self timed repeaters in a pulse transmission system is assured, since a pulse must occur in at least every third time slot while the repeaters themselves only require at least one pulse in approximately every fifteen time slots in order to derive a timing signal.

Figure 3:
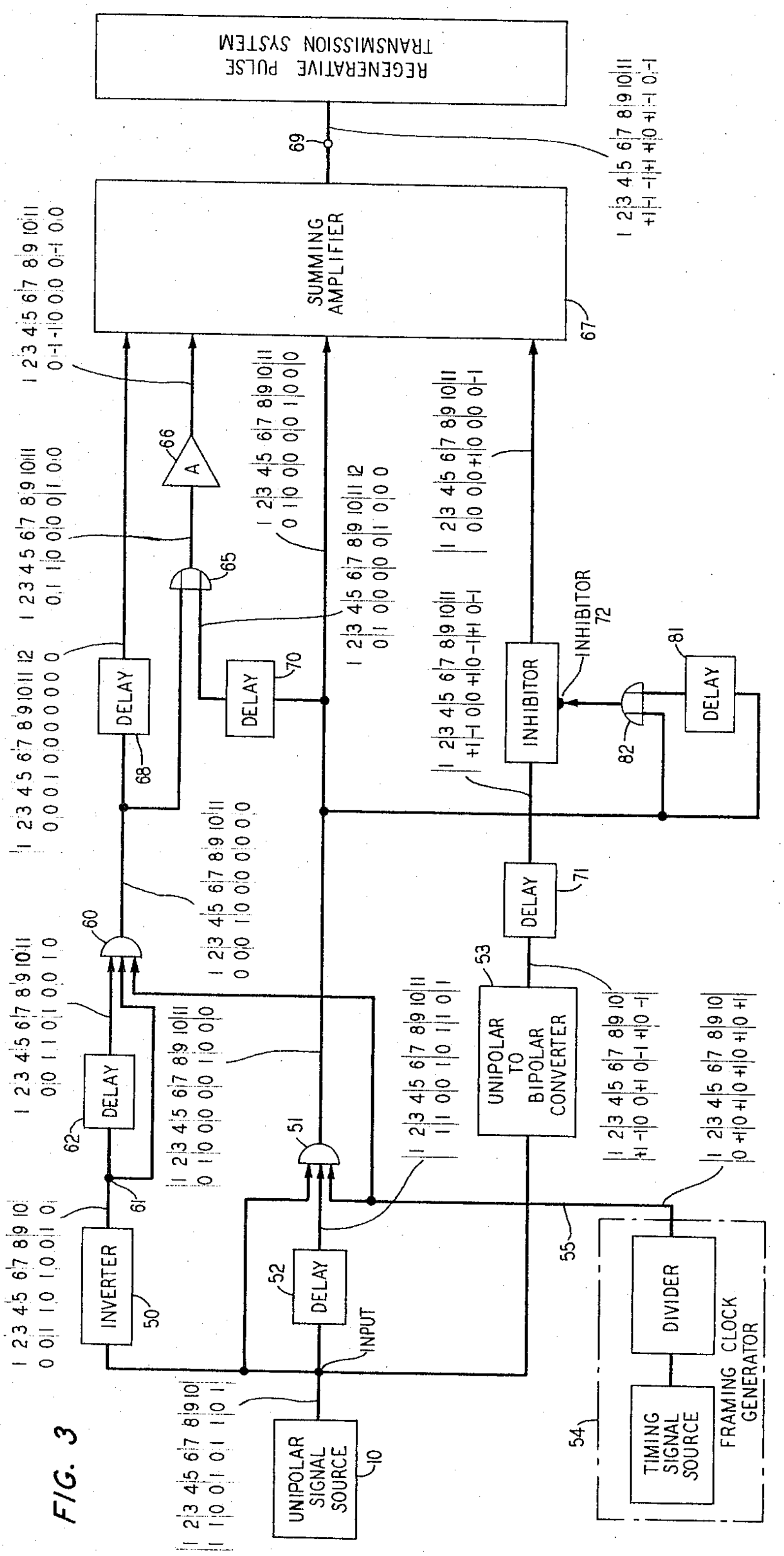
FIG. 3 is a block diagram of a second unipolar to three state code converter embodying this invention.

A source of unipolar pulses 10 is shown in FIG. 3 connected to the input terminal of a second converter circuit embodying this invention. The output of the unipolar signal source 10 is connected to an inverter circuit 50, one input terminal of an AND gate 51, a delay circuit 52 which introduces a delay of one time slot, and to a unipolar to bipolar converter 53, similar to converter 37 in FIG. 2. A framing clock generator circuit 54 which is the same as circuit 11 described in FIG. 2 generates pulses at its output terminal 55 during each even numbered time slot as indicated by the output signal shown at output terminal 55. Again, as in connection with the embodiment of the invention shown in FIG. 2, the output signal from the framing clock generator 54 is employed to divide the incoming unipolar signals into words of two bits each so that they may be encoded in accordance with the selected three state code shown in FIG. 1. To this end, the output of framing clock generator 54 is connected to a second input terminal of AND gate 51 and also to one input terminal of AND gate 60.

In accordance with the code shown in FIG. 1 each 0, 0 binary word is encoded as −1, +1 in each code set. To accomplish this result inverter or NOT circuit 50, which serves to convert marks to spaces and vice versa, has its output terminal 61 connected to a second input terminal of AND gate 60 and to the input terminal of delay circuit 62 which delays the output of the inverter 50 by one time slot and applies it to a third input terminal of AND gate 60. Since AND gate 60 is enabled only during each even numbered time slot by the output signal of framing clock generator 54, a pulse is generated at the output terminal of AND gate 60 only upon the presence of a binary word 0, 0. Thus, for example, during the fourth time slot a pulse is generated at the output terminal of AND gate 60 which is applied through OR gate 65 to phase inverting amplifier 66. Amplifier 66 has a gain of −1 and its output terminal is connected to one input terminal of a summing amplifier 67 at whose output terminal the three state code signals are obtained.

The output of AND gate 60 is also delayed one time slot by delay circuit 68 whose output terminal is connected to a second input terminal of summing amplifier 67. As a result the three state code word −1, +1 is generated during the fourth and fifth time slots at the output terminal 69 of summing amplifier 67 in response to a binary word 0, 0 in the input signal from source 10, during the third and fourth time slots. As was true of the embodiment of the invention shown in FIG. 2, each three state output code word is delayed by one time slot from the input signal.

Binary words 1, 1 are encoded as the three state code word +1, −1 in both code sets of the three state code shown in FIG. 1. This encoding is accomplished by the apparatus to be described below which follows AND gate 51. AND gate 51 is enabled during even numbered time slots to produce an output signal when a pulse is present at the input terminal of the converter during that even numbered time slot and the immediately preceding odd numbered time slot. Thus, for the typical input signal shown, AND gate 51 produces a pulse in both the second and eighth time slots. The output of AND gate 51 is applied to a second input terminal of summing amplifier 67.

The output signal from AND gate 51 is also applied to delay circuit 70 where it is delayed one time slot and then applied to one input terminal of OR gate 65 and thence through phase inverting amplifier 66 to the summing amplifier 67. Thus during the second time slot, for example, a pulse is applied from the output terminal of AND gate 51 to the summing amplifier 67 directly, and, in addition, is delayed by delay circuit 70 and inverted by the amplifier 66 so that a negative pulse is applied to the summing amplifier 67 during the third time slot. The result is that for the binary word 1, 1 in the first and second time slots the three state word +1, −1 is generated at output terminal 69 of summing amplifier 67. A similar result occurs when the binary word 1, 1 appears during the seventh and eighth time slots and the word +1, −1 is generated at the output terminal during the eighth and ninth time slots.

Unipolar to bipolar converter 53 generates the proper three state code word upon the occurrence of the binary word 1, 0 or 0, 1. The output of the unipolar to bipolar converter is delayed one time slot by delay circuit 71 and applied to an inhibitor circuit 72, which may be that type shown on page 404 of the above mentioned text by Millman and Taub. By the use of the delay circuit 81 and OR gate 82 the pulses applied to the inhibit terminal of inhibitor 72 are caused to operate not only in the time slot in which they occur but also in the next following time slot.

The output of the inhibitor circuit 72 is inhibited for two time slots by the presence of a pulse at its inhibitor input terminal which is connected to the output terminal of AND gate 51. Since AND gate 51 generates a pulse during both the second and eighth time slots, inhibitor circuit 72 is inhibited during the second, third, and eighth and ninth time slots and will not pass the signal from delay circuit 71 during those time slots. At all other times, however, the output signal from delay circuit 71 is transmitted through inhibitor circuit 72 to produce the proper three state word for the binary input word. Thus during the fifth and sixth time slots the binary word 1, 0 appearing at the output terminal of source 10 is encoded in accordance with the code set number 1 as +1, 0 in the sixth and seventh time slots of the output signal. During the ninth and tenth time slots the binary word 0, 1 is similarly encoded as 0, −1 in the tenth and eleventh time slots, respectively, in accordance with code set number 2, the apparatus operating to encode in accordance with code set number 2 following the generation of a three state code word the algebraic sum of the amplitudes of whose bits is +1. Similarly, the binary words 1, 0 and 0, 1 will again be encoded in accordance with code set number 1 after the eleventh time slot, the binary word 0, −1 generated at output terminal 69 having an algebraic sum of the amplitude of its bit of −1 which causes the encoding to revert to code set number 1.

Figure 4:
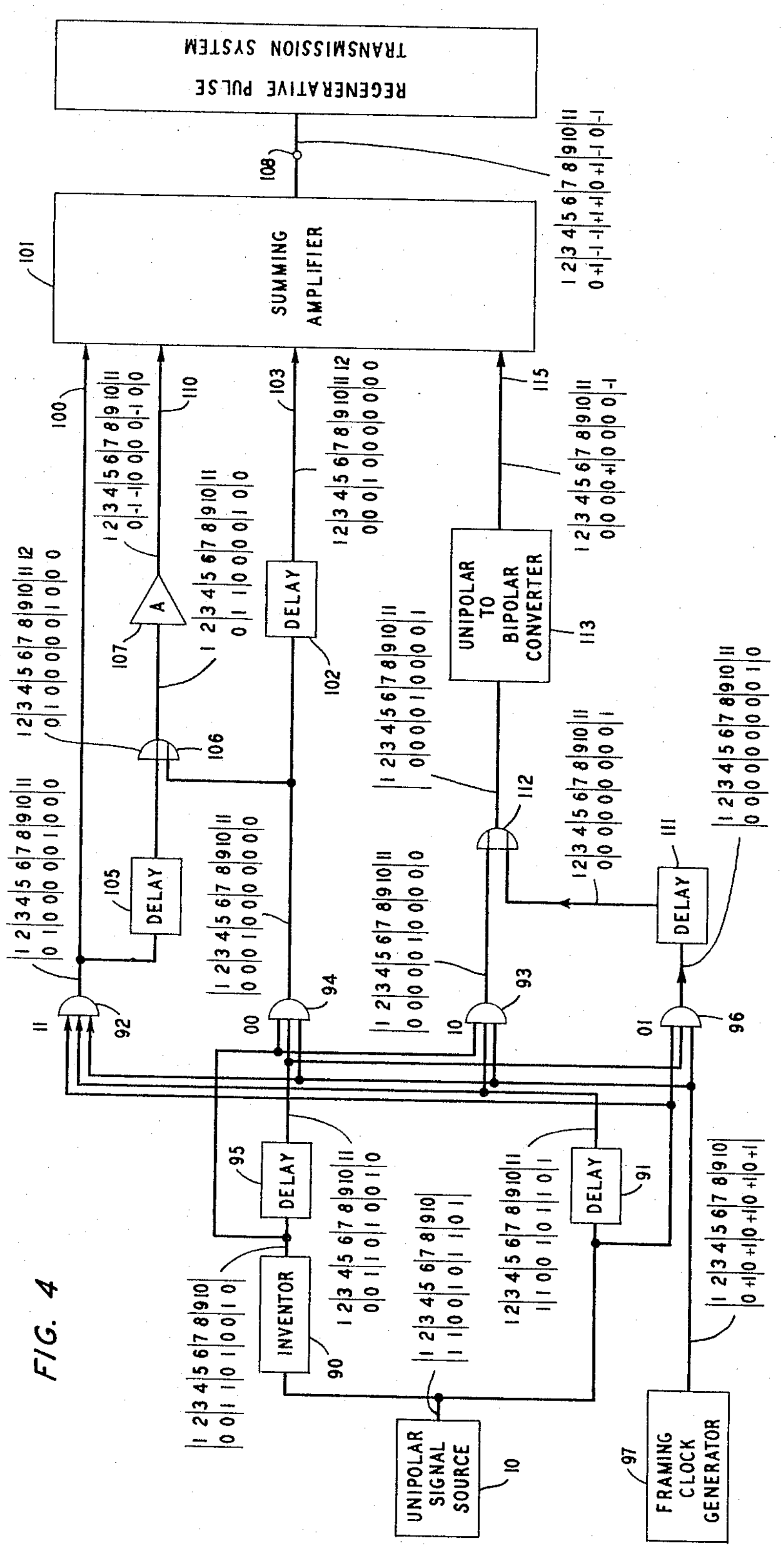
FIG. 4 is a block diagram of a third unipolar to three state code converter embodying this invention.

A third unipolar to three state code converter embodying this invention is shown in block diagram form in FIG. 4. Source 10 of unipolar pulses is connected to an inverter circuit 90, delay circuit 91 which introduces a delay of one time slot and one input terminal of AND gates 92 and 96. The output of delay circuit 91 is applied to one input terminal of each of AND gates 92 and 93 while the output of inverter 90 is applied to one input of AND gates 93 and 94. In addition, the output signal from inverter 90 is applied to a delay circuit 95 which delays the output of inverter 90 by one time slot and applies it to the second input of AND gate 94 and to one input of AND gate 96. In addition, each of the AND gates 92, 93, 94 and 96 is connected to the output of the framing clock generator 97, which is the same as that described in connection with FIG. 2, so that each of the AND gates 92, 93, 94 and 96 can only be actuated during even numbered time slots.

AND gate 92 and AND gate 94 comprise the input apparatus to the circuitry which generates the three state code signals for the binary words 1, 1 and 0, 0. AND gate 92 is connected to receive the delayed input signal from delay circuit 91 and the input signal itself and produces an output signal in an even numbered time slot under the control of framing clock generator 97 when the input signal from source 10 was a mark in that even numbered time slot and the immediately preceding time slot. AND gate 94, which is connected to receive the inverted input signal from inverter 90 and the delayed inverted input signal from delay circuit 95 produces an output signal in an even numbered time slot when a space was present in the input signal in that even numbered time slot and the immediately preceding time slot. Thus AND gate 92 produces a pulse in the second and eighth time slots in response to binary words 1, 1 in the first, second, seventh and eighth time slots. AND gate 94 similarly produces a pulse in the fourth time slot in response to the binary word 0, 0 in the third and fourth time slots.

The output from AND gate 92 is applied to one input terminal 100 of a summing amplifier 101 and the output of AND gate 94 is delayed by delay circuit 102 and applied to a second input terminal 103 of summing amplifier 101. In addition, the output of AND gate 92 is delayed one time slot by delay circuit 105 and then this delayed output and the output from AND gate 94 are applied through OR gate 106 to an amplifier 107 which serves to invert the polarity of the output of OR gate 106. The output of phase inverting amplifier 107 is applied to a third input terminal 110 of amplifier 101.

The signals applied to input terminals 100, 103 and 110 of the summing amplifier 101 make up the three state words which are generated in response to binary words 1, 1 and 1, 0. The signals applied to terminal 100 from AND gate 92 provide the first bit of the three state code word to be generated in response to the binary word 1, 1 while the second bit of the word is obtained through the path comprising delay circuit 105, OR gate 106 and amplifier 107. Similarly, the delayed output of AND gate 94 provides the second bit of the three state code word to be generated in response to the binary word 0, 0 while the first bit is obtained by inverting the output of AND gate 94 by means of amplifier 107. Thus in response to the binary word 1, 1 in the first, second, seventh and eighth time slots, three state code words +1 and −1 are generated in the second, third, and eighth and ninth time slots, the output signal appearing at terminal 108 of summing amplifier 101. In the fourth and fifth time slots the three state word −1, +1 is generated in response to the binary word 0, 0 at the input terminal in the third and fourth time slots. Output terminal 108 is connected to the input of the regenerative pulse transmission system.

AND gate 93 produces an output signal in an even numbered time slot whenever the binary word, 1, 0 appears at the output of source 10. Similarly, AND gate 96 generates an output pulse when the binary word 0, 1 is present in the input signal. Thus in response to the binary word 1, 0 in the fifth and sixth time slots of the input signal AND gate 93 generates a pulse in the sixth time slot while in response to the binary input word 0, 1 in the ninth and tenth time slots of the input signal AND gate 96 generates a pulse in the tenth time slot which is then delayed one time slot by delay circuit 111 and applied to one input terminal of OR gate 112. The output of AND gate 93 is also connected to OR gate 112 so that a pulse is generated at the output terminal of OR gate 112 during the sixth and eleventh time slots. This signal is then applied to a unipolar to bipolar converter 113 which generates a positive pulse in the sixth time slot and a negative pulse in the eleventh time slot and which applies the resulting output signal to input terminal 115 of summing amplifier 101. Thus in response to the binary word 1, 0 in the fifth and sixth time slots the three state code word +1, 0 is generated in accordance with code set number 1 in the sixth and seventh time slots while in response to the binary word 0, 1 in the ninth and tenth time slots the three state code word 0, 1 is generated in the tenth and eleventh time slots. Thus, again, the apparatus first generates three state code words in accordance with code set number 1 until a word is generated the algebraic sum of the amplitude of whose bits is +1 whereupon further words are generated in accordance with code set number 2.

The result of this coding operation accomplished by each of the converters shown in FIGS. 2, 3 and 4 is that the resulting pulse train has no direct current component over even a small number of time slots and, in addition, it is impossible for more than two time slots to elapse before the occurrence of a pulse. Again, this facilitates the use of self-timed repeaters in the transmission system connected to the output terminals of the converter, and insures proper operation of the repeaters under all possible conditions of the input signal since it is impossible for more than two consecutive spaces or zeros to occur. Thus, for example, even if a very large number of spaces appear at the output terminal of source 10, the signal applied to the transmission system will consist of pulses of positive and negative polarity rather than spaces as in the prior art.

Figure 5:
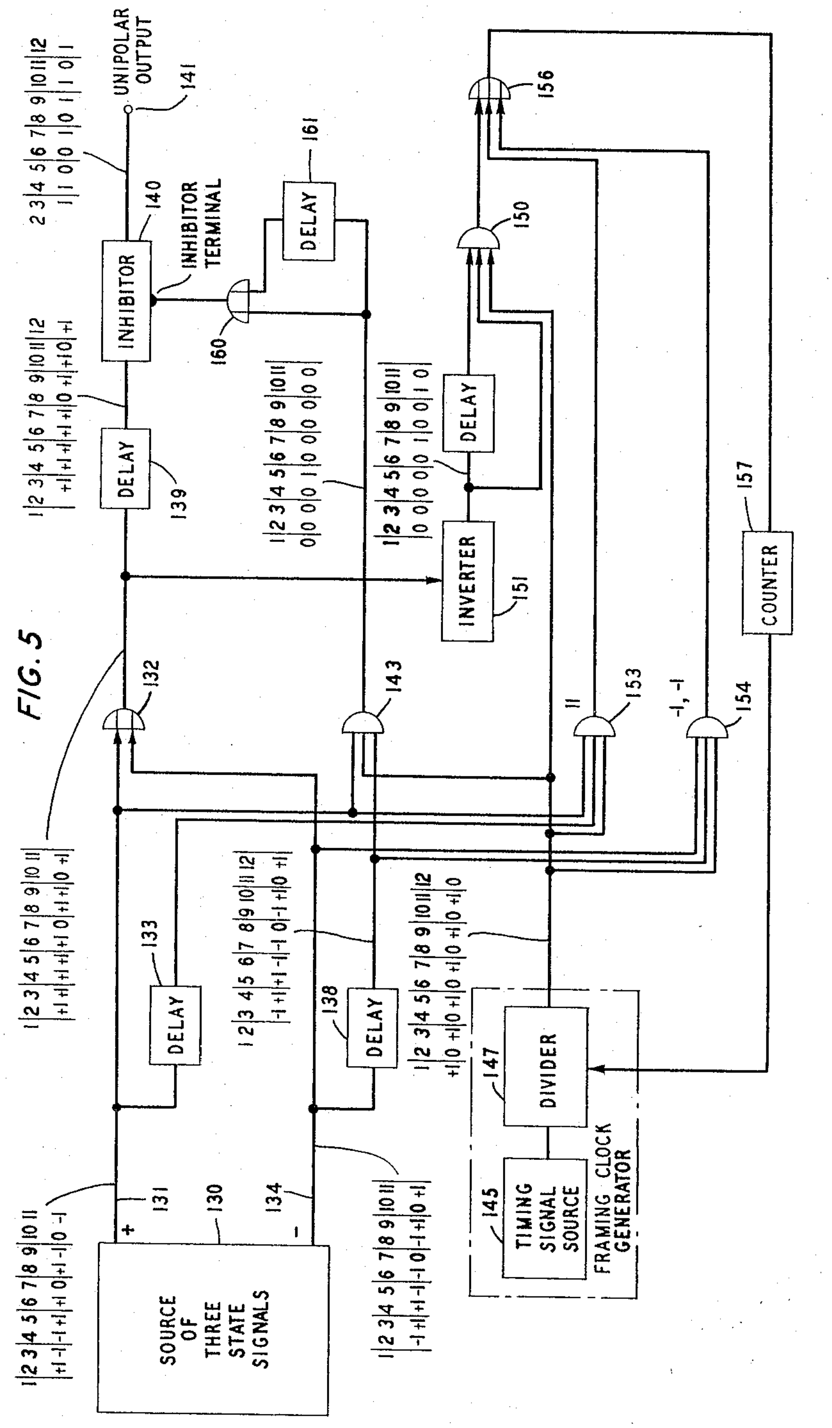
FIG. 5 is a block diagram of a three state code to unipolar code converter.

At the receiving terminal it is necessary to convert the three state signals generated in accordance with code set number 1 and code set number 2 back into unipolar pulses. A converter for making this conversion is shown in FIG. 5. The source of the three state signals is source 130 which is in reality the output of the transmission system as it appears at the receiving terminal. The transmission system shown in United States Patent 2,996,578 and described on pages 1–24 of the Bell System Technical Journal for January 1962 employs transformer coupling and as a result balanced positive and negative going output signals are readily available. The positive output signals at terminal 131 are applied to an OR gate 132 and to a delay circuit 133 which delays the input signal by one time slot. The input signal shown at the output terminal 131 of source 130 is the same in polarity as that generated at the output terminals of the summing amplifiers of each of the unipolar to three state code converters shown in FIGS. 2, 3 and 4. At terminal 134 of source 130 a signal is present in which the pulses are reversed in polarity from that shown at terminal 131. Output terminal 134 of source 130 is applied to a second input terminal of OR gate 132 and also applied to a delay circuit 138 which delays the signal by one time slot.

Were it not for the three state word 0, 0 all that would be required to convert from the three state code to the unipolar binary code would be to rectify the three state signal as the three state code words generated for binary words 1, 0, 1, 0 and 0, 1 are the same as the binary words if all the "ones" were of the same polarity. Rectification of the three state signal alone, however, is not completely sufficient to convert the three state signal back to the binary signal due to the fact that the binary word 0, 0 is converted to the word —1, +1 in both code sets so that it is impossible by mere rectification to obtain the true binary signal for the binary word 0, 0. In order to reproduce the binary word 0, 0 when the word —1, +1 is received from source 130 it is necessary to inhibit the output of the rectifier to produce two consecutive zeros during the presence of the three state word —1, +1.

To accomplish rectification of the input signal OR gate 132 generates an output pulse of positive polarity whenever the signal present at terminals 131 or 134 is positive. The output of OR gate 132 represents the rectified signal present at terminals 131 and 134 of source 130 and with the exception of the fact that the binary word 0, 0 is incorrectly reproduced as the binary word 1, 1, the rest of the output signal is correct. To eliminate the error found, by merely rectifying the signal from source 130, in the conversion of the three state word —1, +1 the output of OR gate 132 is connected to a delay circuit 139 whose output is applied to an inhibitor circuit 140. The inhibitor circuit is inhibited for two time slots during the presence of the word —1, +1 at terminal 131 of source 130 so that at the output terminal 141 of the converter a 0, 0 is generated to correspond to the word —1, +1.

AND gate 143 determines the presence of the three state word —1, +1 and its output is applied to the inhibitor terminal of inhibitor circuit 140 for two time slots by the use of delay network 161 and OR gate 160. There are three input terminals on AND gate 143. The first is connected to output terminal 131 of source 130, and the second is connected to the output terminal of delay circuit 138. AND gate 143 is enabled during every odd numbered time slot by the output of a framing clock generator which is essentially the same circuit as described in connection with FIGS. 2, 3 and 4. That is, a timing signal source 145 is found at each terminal of the pulse transmission system and generates clock pulses which are then applied to the input of a divider circuit 147 which generates an output pulse during every odd numbered time slot. The output of the divider circuit provides the third input signal to AND gate 143 so that during every odd numbered time slot AND gate 143 will be enabled if during that time slot and the immediately preceding time slot a word —1, +1 was present at terminal 131 of source 130. This word corresponds to the binary word 0, 0, and AND gate 143 produces an output signal which inhibits inhibitor circuit 140 for two time slots producing the binary word 0, 0, at output terminal 141.

In order to inhibit inhibitor circuit 140 for two time slots the output terminal of AND gate 143 is applied to one input terminal of an OR gate 160 and also to a delay circuit 161 which introduces a delay of one time slot. The output of the delay circuit 161 is connected to the second input terminal of OR gate 160 while the output terminal of OR gate 160 is connected to the inhibitor terminal of inhibitor circuit 140.

If it could be assured that the phase of the framing clock generator at the receiving terminal and the phase of the framing clock generator at the transmitting terminal of the regenerative pulse transmission system were always the same there would be no need for additional circuitry in the converter shown in FIG. 5. However, the possibility of loss of synchronization exists which, if it occurred, would result in the incorrect conversion from three state words to binary words. To examine whether the transmitter and receiver are properly synchronized it is necessary only to examine the received signal and determine whether any words are received which are not present in either code set number 1 or code set number 2. The only three state code words which are not present in these code sets are the words 0, 0, +1, +1 and —1, —1. Whenever such a word occurs the clock generators at the transmitter and receiver may no longer be in phase, and the divider circuit 147 should be advanced one time slot in order to correct for this error in loss of synchronization.

AND gate 150 examines the received signal and generates an output signal whenever the three state word 0, 0 occurs. To accomplish this the output of OR gate 132 is connected to an inverter 151 and the output of the inverter applied to one input terminal of AND gate 150 and also delayed by one time slot and applied to a third input terminal of AND gate 150. As a result of AND gate 150 being enabled by the output of divider circuit 147 a pulse will be generated whenever the word 0, 0 is received.

Similarly, AND gates 153 and 154 examine the received words to detect the presence of words +1, +1 or —1, —1. Both AND gates 153 and 154 are connected to the output of divider circuit 147. In addition, the remaining input terminals of AND gate 153 are connected to terminal 131 of source 130 and the output of delay circuit 133. Thus the reception of the word +1, +1 produces an output from AND gate 153. Similarly, AND gate 154 is connected to output terminal 134 of source 130 and to the output terminal of delay circuit 138 and produces an output signal upon the reception of the word —1, —1. The output terminals of AND gates 150, 153 and 154 are each applied to an input terminal of OR gate 156, so that OR gate 156 produces an output signal whenever an incorrect word is received. This output signal is counted by counter 157 and after a predetermined number of counts indicating that more than a spurious error has occurred a signal is generated by counter 157 to change the phase of divider circuit 147 by one time slot.

This in accordance with this invention binary input signals are divided into binary words of two bits each, encoded into three state code signals in accordance with two code sets, transmitted over a regenerative pulse transmission system employing self-timed repeaters and the transmitted words reconverted at the receiving terminal to the binary signal. The result of such transmission is a transmitted signal having a zero direct current level, even over a small number of time slots, and having no more than two consecutive zeros regardless of the number of consecutive zeros in the binary input signal. This latter result facilitates the use of self-timed repeaters as it insures the accurate generation of a timing signal at each repeater.

It is to be understood that the above described arrangements are illustrative of the application of the principles of the invention. Numerous other arrangements may be devised by those skilled in the art without departing from the spirit and scope of the invention.

What is claimed is:

1. Apparatus for converting binary pulse signals into three state signals of positive pulses, negative pulses and spaces comprising means to divide the binary pulse signals into binary words of a plurality of bits, means connected to the output of said dividing means to convert the said binary words into three state signals of the same number of bits as said binary words in accordance with a first predetermined code until a three state signal having a first predetermined direct current component is generated, and means connected to the output of said dividing means to convert said binary words into three state signals of the same number of bits as said binary words in accordance with a second predetermined code after the occurrence of a three state signal having said first predetermined direct current component until a three state signal is generated having a second predetermined direct current component whereupon said conversion is again accomplished in accordance with said first code until a three state signal having said first predetermined direct current component is generated again, said first and second predetermined codes and the transfer of conversion from one predetermined code to the other in response to the generation of three state signals having predetermined direct current components assuring that the number of consecutive spaces is less than three.

2. Apparatus for converting binary pulse signals into three state signals of positive pulses, negative pulses and spaces comprising means to divide the binary pulse signals into binary words of two bits each, means connected to the output of said dividing means to convert said binary words into two-bit three state signals in accordance with a first predetermined code until a three state signal having a first predetermined direct current component is generated, and means connected to the output of said dividing means to convert said binary words into three state signals in accordance with a second predetermined code after the occurrence of a three state signal having said first predetermined direct current component until a three state signal is generated having a second predetermined direct current component whereupon said conversion is again accomplished in accordance with said first code until a three state signal having said first predetermined direct current component is again generated, said first and second predetermined codes and the transfer of conversion from one predetermined code to the other in response to the generation of three state signals having predetermined direct current components assuring that the number of consecutive spaces is not more than two.

3. Apparatus for converting binary pulse signals into three state signals of positive pulses, negative pulses and spaces comprising means to divide the binary pulse signals into binary words of two bits each, means connected to the output of said dividing means to convert said binary words into two-bit three state signals in accordance with a first predetermined code until a three state signal having a positive direct current component is generated, and means connected to the output of said dividing means to convert said binary words into three state signals in accordance with a second predetermined code after the occurrence of a three state signal having said positive direct current component until a two-bit three state signal is generated having a negative direct current component whereupon said conversion is again accomplished in accordance with said first code until a three state signal having said positive direct current component is generated again, said first and second predetermined codes and the transfer of conversion from one predetermined code to the other in response to the generation of three state signals having positive and negative direct current components assuring that the number of consecutive spaces is less than three.

4. Apparatus for converting binary pulse signals from a source of pulses into three state signals of positive pulses, negative pulses and spaces so that the number of consecutive spaces is not more than two, comprising means to convert the binary pulse signals into binary words of two bits each, means to convert the two-bit binary words into two-bit three state signals in accordance with the following first code

| Binary Word | Code 1 |
|---|---|
| 1, 1 | +1 −1 |
| 1, 0 | +1 0 |
| 0, 1 | 0 +1 |
| 0, 0 | −1 +1 |

until a two-bit three state signal the algebraic sum of the amplitude of whose bits is +1 is generated, and means to convert said two-bit binary words into three state signals in accordance with the following second code

| Binary Word | Code 2 |
|---|---|
| 1, 1 | +1 −1 |
| 1, 0 | −1 0 |
| 0, 1 | 0 −1 |
| 0, 0 | −1 +1 |

after the occurrence of a two-bit three state signal the algebraic sum of the amplitude of whose bits is +1 until a two-bit three state word is generated having an algebraic sum of the amplitude of its bits is −1 whereupon said conversion is again accomplished in accordance with said first code until a two-bit three state signal the algebraic sum of the amplitude of whose bits is +1 is again generated.

5. Apparatus for converting binary pulse signals from a signal source into three state signals of positive pulses, negative pulses and spaces so that the number of consecutive spaces is not more than two, comprising means to divide the binary pulse signals from said source into two-bit binary words, means to encode said two-bit binary words into two-bit three state signal words in accordance with the code

| Binary Word | Code #1 | Code #2 |
|---|---|---|
| 1, 1 | +1 −1 | +1 −1 |
| 1, 0 | +1 0 | −1 0 |
| 0, 1 | 0 +1 | 0 −1 |
| 0, 0 | −1 +1 | −1 +1 |

where said two-bit binary words are encoded in accordance with code number 1 until the generation of a two-bit word the algebraic sum of the amplitude of whose bits is +1 said binary words then being encoded in accordance with code number 2 until the generation of a two-bit word the algebraic sum of the amplitude of whose bits is −1 whereupon said encoding is again accomplished in accordance with code number 1, said encoding means comprising unipolar to bipolar conversion means connected to said source to receive said binary pulse signals, a four input terminal first summing amplifier, first delay means connecting the output of said unipolar to bipolar converter to one input terminal of said summing amplifier, a three input terminal first AND gate which generates an output signal upon the occurrence of the binary word 1, 1 said AND gate connected to receive said binary input signal, said binary input signal delayed by one time slot, and the output signal from said means which divides said binary input signal into words of two bits each, a second amplifier whose input is connected to the output of said first AND gate and which doubles the amplitude of each pulse generated by said first AND gate, means connecting the output of said second amplifier to a second input terminal of said summing amplifier, an OR gate whose input is connected to receive said binary input signal and said binary input signal delayed by one time slot the output of said OR gate being connected to the input of an inverter circuit so that at the output of said inverter circuit a mark is generated when said binary signal source generates two consecutive zeros, a second AND gate, means to connect the output of said inverter circuit and said means which divides said input signal into two-bit binary words to the inputs of said second AND gate, second delay means which introduces a delay of one time slot connected between the output of said second AND gate and a third input terminal of said summing amplifier, a second summing amplifier, a third delay circuit connected between the output of said second amplifier and the input of said second summing amplifier, means connecting the output of said second AND gate to the input of said second summing amplifier so that the output signal from said third delay circuit and the output signal from said second AND gate are added together by said second summing amplifier, a phase inverting amplifier, means connecting the output of said second summing amplifier to the input of said phase inverting amplifier, and means connecting the output of said phase inverting amplifier to the fourth input terminal of said first summing amplifier.

6. Apparatus for converting binary pulse signals from a signal source into three state signals of positive pulses, negative pulses and spaces so that the number of consecutive spaces is not more than two, comprising, means to divide the binary pulse signals from said source into two-bit binary words, means to encode said two-bit binary words into two-bit three state signal words in accordance with the following code

| Binary Word | Code #1 | Code #2 |
|---|---|---|
| 1, 1 | +1 −1 | +1 −1 |
| 1, 0 | +1 0 | −1 0 |
| 0, 1 | 0 +1 | 0 −1 |
| 0, 0 | −1 +1 | −1 +1 |

where said two-bit binary words are encoded in accordance with code number 1 until the generation of a two-bit word the algebraic sum of the amplitude of whose bits is +1 said binary words then being encoded in accordance with code number 2 until the generation of a two-bit word the algebraic sum of the amplitude of whose bits is −1 whereupon said encoding is accomplished again in accordance with code number 1, said encoding means comprising a first AND gate to determine the generation of the binary word 1, 1 by said signal source said first AND gate being connected to receive said binary input signal, said input signal delayed by one time slot, and the output of said means which divides said binary pulse signals into two-bit words, a four input terminal summing amplifier, means connecting the output of said first AND gate to a first input terminal of said summing amplifier, means to determine the generation of the binary word, 0, 0 by said signal source comprising an inverter connected to receive said input signal from said source the output of said inverter being connected to a first input terminal of a second three input terminal AND gate, means connecting the output of said means which divides said binary pulse signal into two-bit words to a second input terminal of said second AND gate, a first delay circuit connected between the output of said inverter and the third input terminal of said second AND gate, a second delay circuit connected between the output of said second AND gate and a second input of said summing amplifier, an OR gate, means connecting the output of said second AND gate to one input terminal of said OR gate, a third delay circuit connected between the output of said first AND gate and a second input terminal of said OR gate, a phase inverting amplifier to invert the phase of the output of said OR gate and apply the inverted signal to a third input terminal of said summing amplifier so that the signals applied to said first three input terminals of said summing amplifier result in the generation at the output of said summing amplifier of words in accordance with codes numbers 1 and 2 for the binary words 1, 1 and 0, 0, a unipolar to bipolar converter connected to receive said signals from said source of binary signals, a fourth delay circuit connected to the output of said unipolar to bipolar converter to delay the output of said converter by one time slot, and inhibitor means connected between the output of said fourth delay circuit and the fourth input terminal of said summing amplifier said inhibitor means being inhibited during two time slots following the generation by said signal source of the binary word 1, 1, by the output of said first AND gate so that the total signal appearing at the output of the summing amplifier is a representation of the binary pulse train in accordance with the above code.

7. Apparatus in accordance with claim 4 in which said converting means comprises, four AND gates, an inverter circuit connected to receive said signals from said source, a first delay circuit connected to the output of said inverter circuit, a second delay circuit connected to receive signals from said source, means connecting a first input terminal of a first said AND gates to said signal source, means connecting a second input terminal of said first AND gate to the output of said second delay circuit, means connecting a third input terminal of said first AND gate to the output of said means which divides said input signal into two-bit words so that said first AND gate generates an output signal upon the occurrence of the binary word 1, 1, means connecting a first input terminal of a second of said AND gates to the output of said inverter circuit, means connecting a second input terminal of said second AND gate to the output of said first delay circuit, means connecting a third input terminal of said second AND gate to the output of said means which divides said input signal into two-bit words so that said second AND gate generates an output signal upon the occurrence of the binary word, 0, 0, means connecting a first input terminal of a third of said AND gates to the output of said inverter circuit, means connecting a second input terminal of said third AND gate to the output of said second delay circuit, means connecting a third input terminal of said third AND gate to the output of said means which divides said input signal into two-bit words so that said third AND gate generates an output signal upon the occurrence of the binary word 1, 0, means connecting the output of said first delay circuit to a first input terminal of a fourth of said AND gates, means connecting a second input terminal of said fourth AND gate to said source of binary input signals, means connecting the third input terminal of the fourth AND gate to the output of said means which divides said input signal into two-bit words so that said fourth AND gate generates an output signal upon the generation of a binary word 0, 1 by said source, a four input terminal summing amplifier, means to connect the output of said first AND gate to a first input terminal of said summing amplifier, third delay means to delay the output of said second AND gate and apply it to a second input terminal of said summing amplifier, a first OR gate, means to apply the output of said second AND gate to one input terminal of said first OR gate, a fourth delay circuit connected between the output of said first AND gate and a second input terminal of said OR gate, a phase-inverting amplifier having its input connected to the output of said first OR gate and its output connected to a third input terminal of said summing amplifier so that the signal at the output terminal of said summing amplifier is the encoded signal for the binary words 1, 1 and 0, 0 in response to the signals applied to the first three input terminals of said summing amplifier, a unipolar to bipolar converter, a second OR gate, a fifth delay circuit connected between the output terminal of said fourth AND gate and one input terminal of said OR gate, means connecting a second input terminal of said OR gate to the output of said third AND gate, means connecting the output of said OR gate to the input of said unipolar to bipolar converter so that said unipolar to bipolar converter encodes the binary words 1, 0 and 0, 1, and means connecting the output of said unipolar to bipolar converter to the fourth input terminal of said summing amplifier.

8. Apparatus for converting two-bit three state signals of positive pulses, negative pulses and spaces into binary unipolar output signals, comprising a source of three state two-bit word signals, means to rectify the output signals from said source of three state signals, and means connected to said rectifying means to inhibit the output of said rectifying means during the presence of a three state word —1, +1 so that the outputs of said apparatus is in accordance with the following code

| Binary Word | Code #1 | Code #2 |
|---|---|---|
| 1, 1 | +1 —1 | +1 —1 |
| 1, 0 | +1 0 | —1 0 |
| 0, 1 | 0 +1 | 0 —1 |
| 0, 0 | —1 +1 | —1 +1 |

9. Apparatus for converting three state signals of positive marks, negative marks and spaces from a source of such signals into binary unipolar output signals, comprising means to divide said input signals from said three state signal source into two-bit words, an OR gate connected to receive said input signals to produce a rectified representation of said signals at its output terminal, and an inhibitor circuit connected to the output terminal of said OR gate, and means to inhibit said inhibitor circuit for two time slots following the generation of the three state word —1, +1 by said input signal source, said means comprising a three terminal AND gate connected to receive at its input terminals said input signals, said input signals delayed by one time slot, and also being connected to receive the output of said means which divides said input signal into two-bit three state signals, means connecting the output terminal of said AND gate to inhibit said inhibitor circuit so that the output of said inhibitor circuit is the binary unipolar representation of said three state signals in accordance with the following code

| Binary Word | Code #1 | Code #2 |
|---|---|---|
| 1, 1 | +1 —1 | +1 —1 |
| 1, 0 | +1 0 | —1 0 |
| 0, 1 | 0 +1 | 0 —1 |
| 0, 0 | —1 +1 | —1 +1 |

10. Apparatus for converting binary pulse signals into pulse signals having at least three possible levels comprising means to divide the binary pulse signals into binary words of a plurality of bits, means connected to the output of said dividing means to convert said binary words into pulse signals in accordance with a first predetermined code until a pulse signal having a first predetermined direct current component is generated, means connected to the output of said dividing means to convert said binary words into pulse signals in accordance with a second predetermined code after the occurrence of a pulse signal having said first predetermined direct current component until a pulse signal having a second predetermined direct current component is generated, whereupon said conversion is again accomplished in accordance with said first code until a pulse signal is again generated having said first predetermined direct current component said first and second predetermined codes and the transfer of conversion from one predetermined code to the other in response to the generation of pulse signals having predetermined direct current components assuring that the number of consecutive spaces is less than a predetermined number and the direct current level of the resulting signal is zero.

11. Apparatus for converting binary pulse signals into pulse signals having at least three possible levels comprising means to divide the binary pulse signals into binary words of a plurality of bits, means connected to the output of said dividing means to convert said binary words into pulse signals in accordance with a first predetermined code until a pulse signal having a first predetermined direct current component is generated, means connected to the output of said dividing means to convert said binary words into pulse signals in accordance with a second predetermined code until a pulse signal having a second predetermined direct current component is generated, means for bringing into operation the second means to convert whenever the output of the first means to convert is a signal having said first predetermined direct current component, and means for again bringing into operation the first means to convert whenever the output of the second means to convert is a signal having said second predetermined direct current component said first and second predetermined codes and the transfer of conversion from one predetermined code to the other in response to the generation of pulse signals having predetermined direct current components assuring that the number of consecutive spaces is less than a predetermined number and the direct current level of the resulting signal is zero.

References Cited by the Examiner

UNITED STATES PATENTS

| | | | |
|---|---|---|---|
| 2,700,696 | 1/1955 | Barker | 340—347 |
| 3,126,537 | 3/1964 | Trampel | 340—347 |
| 3,149,323 | 9/1964 | Aaron et al. | 340—347 |
| 3,154,777 | 10/1964 | Thomas | 340—347 |

MAYNARD R. WILBUR, *Primary Examiner.*

MALCOLM A. MORRISON, DARYL W. COOK, *Examiners.*

W. J. KOPACZ, *Assistant Examiner.*